United States Patent [19]
Kamgar

[11] Patent Number: 5,951,635
[45] Date of Patent: Sep. 14, 1999

[54] ASYNCHRONOUS FIFO CONTROLLER

[75] Inventor: Hassan Kamgar, Milpitas, Calif.

[73] Assignee: VLSI Technology, Inc., San Jose, Calif.

[21] Appl. No.: 08/751,637

[22] Filed: Nov. 18, 1996

[51] Int. Cl.[6] .................................................. G11C 7/00
[52] U.S. Cl. .................. 709/201; 365/221; 365/189.01; 365/189.02; 365/189.06; 365/230.01; 365/230.02
[58] Field of Search .................. 395/200.63, 200.64, 395/200.67, 821, 881, 527, 553, 182.1, 877; 327/141, 99; 365/189.01, 189.02, 189.04, 221, 230.1, 230.03; 709/201

[56] References Cited

U.S. PATENT DOCUMENTS

| | | | |
|---|---|---|---|
| 5,347,559 | 9/1994 | Hawkins et al. | 377/54 |
| 5,555,524 | 9/1996 | Castellano | 365/221 |
| 5,602,780 | 2/1997 | Diem et al. | 365/189.01 |

Primary Examiner—Moustafa M. Meky
Assistant Examiner—Hieu C. Le
Attorney, Agent, or Firm—Wagner, Murabito & Hao

[57] ABSTRACT

A FIFO controller circuit for interfacing data from a device running at one clock speed so that it is compatible with another device or transmission medium running at a different clock speed. A write controller is used to control the writing of data into the FIFO. The write controller is clocked at a first clock speed. A read controller is used to control the reading of data from the FIFO at a second, different clock speed. A counter is incremented when data is written to the FIFO and decremented when data is read from the FIFO. Thereby, the counter represents an amount of memory within the FIFO that is currently available. The decrement signal is generated in the first clock domain and then synchronized to the second clock domain. This provides error-free interfacing, irrespective of any phase differences existing between the two clock signals.

16 Claims, 6 Drawing Sheets

ASYNCHRONOUS FIFO CONTROLLER

TECHNICAL FIELD

The present invention relates to the field of FIFO controllers. More specifically, the present invention pertains to an asynchronous controller for preserving the integrity of data of a FIFO that is operating under two different clock domains, regardless of the clock phases.

BACKGROUND ART

In the Information Age, data is stored, processed, and transmitted almost exclusively in a digital format. Speech, music, video, text, pictures, etc., are digitized and represented as a series of bits of information in the form of 0's and 1's. This information is thusly converted into a digital format so that it can be readily recognized and processed by a computer system. Basically, a computer system is comprised of multiple integrated circuits, each of which can contain upwards of millions of transistors. These transistors can be either turned off (i.e., "0") or turned on (i.e., "1") in order to accomplish a given task according to a computer program.

A "clock" is used to regulate the speed at which the integrated circuits operate. Initially, computer systems ran at extremely slow rates of speed (i.e., low clock speeds). However, due to rapid advances in semiconductor technology, computers are becoming much faster and more powerful. Likewise, the peripheral devices (e.g., hard disk drives, modems, etc.) supporting the computer systems are becoming faster. Furthermore, the transmission mediums (e.g., twisted pair wires, coaxial cables, fiber optics, etc.) for conveying data in a computer network are experiencing greater transmission rates and throughput. Indeed, the trend is towards ever increasing clock speeds.

One side-effect from the quest for attaining faster clock speeds is the proliferation of devices and transmission mediums that operate at different clock speeds. For example, an older computer system might run at a slower clock speed (e.g., 33 MHz), whereas a newer computer system might run at a much faster clock speed (e.g., 200 MHz). In many instances, there might be a need for the two computer systems to communicate with each other. However, there is a problem with interfacing the two computers, which is attributed to the fact that they are incompatible because they run at different speeds. Moreover, this problem is further exacerbated if the medium conveying the data were to have yet a different speed at which data is to be transmitted. In which case, one must synchronize the exchange of data between the computer systems with that of the transmission medium. Moreover, the format of the data itself might have an intrinsic bandwidth, different from that of the computer system or transmission medium. For example, one application might be called upon to accept a 5 MHz video signal for display upon a 120 MHz computer system via a 2 MHz T1 cable. Hence, there must be some way to handle the exchange of data between two devices and/or transmission lines having different clock speeds, without inducing any errors.

This problem posed by devices operating at different clock speeds is quite prevalent. One contributing factor lies with the fact that there exists many various industry standards and protocols. These standards and protocols usually specify a particular speed of operation. Often, the speed set forth by one standard is not compatible with that of another standard. Furthermore, upgrades might cause clock conflicts. In addition, one might desire versatility in a computer system. In which case, the computer system should be adaptable so that it can interface with a host of other devices operating at various clock speeds. Hence, in order to achieve compatibility, upgradability, and adaptability between devices running at different clock speeds, there must be some mechanism for handling the exchange of data between these devices.

FIG. 1 shows a prior art method for handling two different clock speeds. Data is initially input to a flip-flop 101. Flip-flop 101 is clocked at a clock speed of CLK1. The output from flip-flop 101 is then input to logic block 102, such as a FIFO memory. The output from logic block 102 is input to a second flip-flop 103, running at a different clock speed CLK2. The problem with this approach is that the phase differences between the two clocks, CLK1 and CLK2, might result in data errors. Typically, data is sampled at the rising edges of a clock signal. If CLK2 were faster than CLK1, a phase difference (ø) would occur at some points. Due to this difference in phase, the data would be latched at different times, thereby resulting in read errors. In other words, data is constantly varying over time, and the data existing at time $t_1$ is not the same as the data existing at time $t_2$.

Thus, there is a need for an apparatus and method of facilitating the exchange of digital data between two different clock domains. The present invention offers an elegant, efficient solution that preserves data integrity, irrespective of the clock phases. These and other advantages of the present invention will become apparent within discussions of the present invention herein.

DISCLOSURE OF THE INVENTION

The present invention pertains to a FIFO controller circuit for interfacing data from a device running at one clock speed so that it is compatible with another device or transmission medium running at a different clock speed. A write controller is used to control the writing of data into the FIFO. The write controller is clocked at a first clock speed. A read controller is used to control the reading of data from the FIFO at a second, different clock speed. A counter is incremented when data is written to the FIFO and decremented when data is read from the FIFO. In the currently preferred embodiment, an increment and decrement signal is generated according to a number of cells of data being written and/or read. Thereby, the counter represents an amount of memory contained within the FIFO that is currently available. The output from the counter and the decrement signal are both generated in the first clock domain and then synchronized to the second clock domain. This provides error-free interfacing, irrespective of any phase differences existing between the two clock signals.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

An asynchronous first-in-first-out (FIFO) register controller for facilitating the exchange of digital data running at different clock speeds is described in detail. In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention. Furthermore, the controller of the present invention can be equally applied to other types of memories besides FIFO's, such as, last-in first-out (LIFO's) or any such queued memory.

Figure 1:
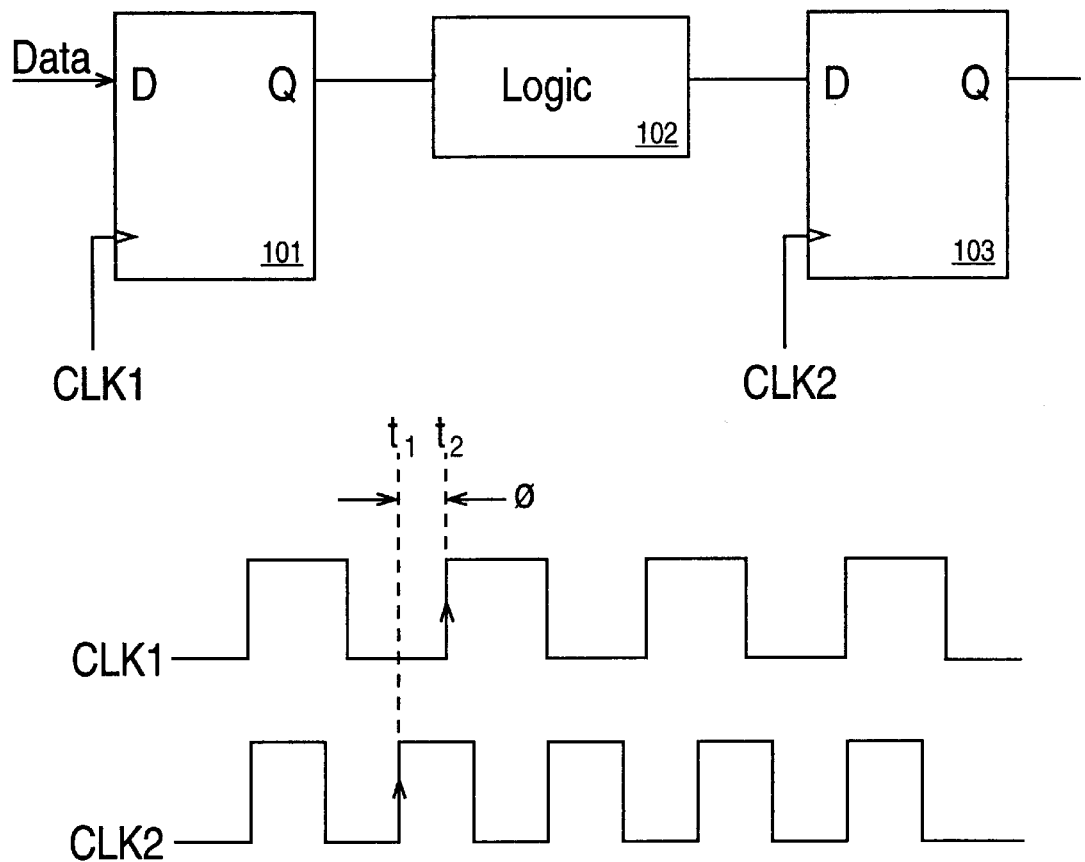
FIG. 1 shows a prior art method for handling two different clock speeds.
Figure 2:
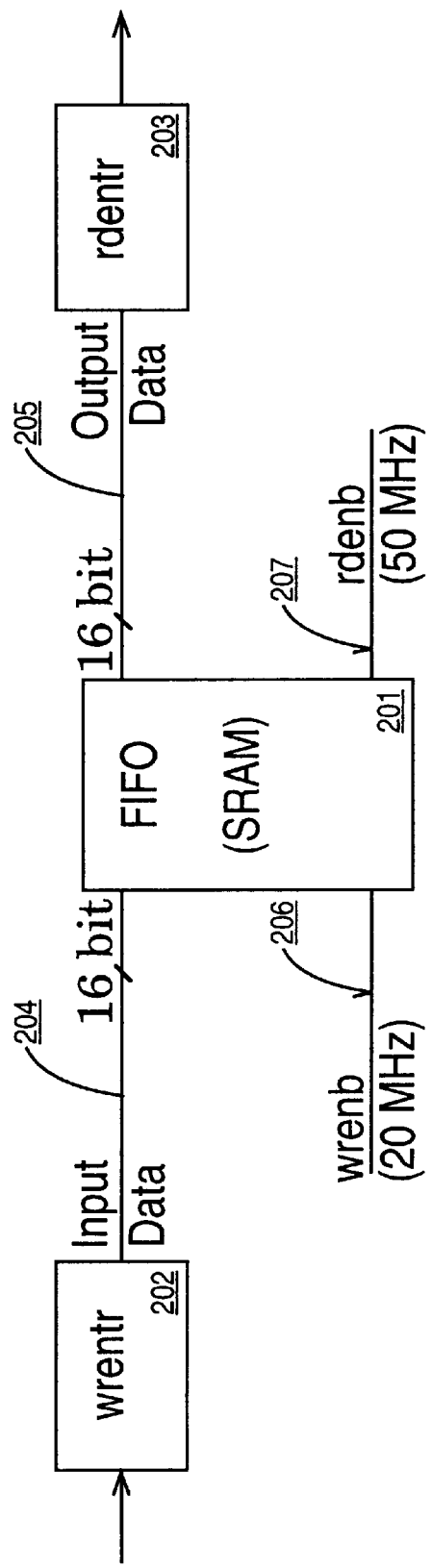
FIG. 2 shows a FIFO 201 for storing digital data.

FIG. 2 shows a FIFO 201 for storing digital data. In this example, FIFO 201 is comprised of static random access memory (SRAM) that is divided into four pages 00-1F, 20-3F, 40-5F, and 60-7F. Data is input to FIFO 201 through line 204. The data stored within FIFO 201 is output via line 205. Within FIFO 201, data is stored in a queue, whereby the data that was stored into memory for the longest time is the next data to be output. For example, if DATA1 were first stored into FIFO 201, followed by DATA2 and DATA3 respectively, then the first piece of data to be read out by FIFO 201 would be DATA1, followed by DATA2 and then DATA3. The data is clocked into FIFO 201 at a write-enable (WRENB) clock speed. The data output from FIFO 201 is read out according to a read-enable (RDENB) clock. The RDENB clock can be at a different speed than that of the WRENB clock. For example, an SDH/SONET application running at 20 MHz may be coupled to the input of FIFO 201, while an asynchronous transfer mode (ATM) device is coupled to the output of FIFO 201.

Since data can be stored into FIFO 201 at a speed different than the speed at which data is being read out, this means that the memory capacity of FIFO 201 is either increasing or decreasing. At some point, FIFO 201 will be completely filled up or will be completely empty. Hence, two counters 202 and 203 are used to keep track of the bytes of data currently contained within FIFO 201. The write counter (WRCNTR) 202 is incremented each time data is written into FIFO 201. The amount of data being written is dependent on the RAM configuration. Read counter (RDCNTR) 203 is incremented each time a byte of data is read out from FIFO 201. The difference between these two counter values indicates the number of bytes currently stored within FIFO 201. Thereby, a device running at one clock speed may be interfaced through FIFO 201 to another device running at a different clock speed so long as FIFO 201 has enough capacity to accommodate the data storage requirement imposed by the different rates of speed.

Figure 3A:
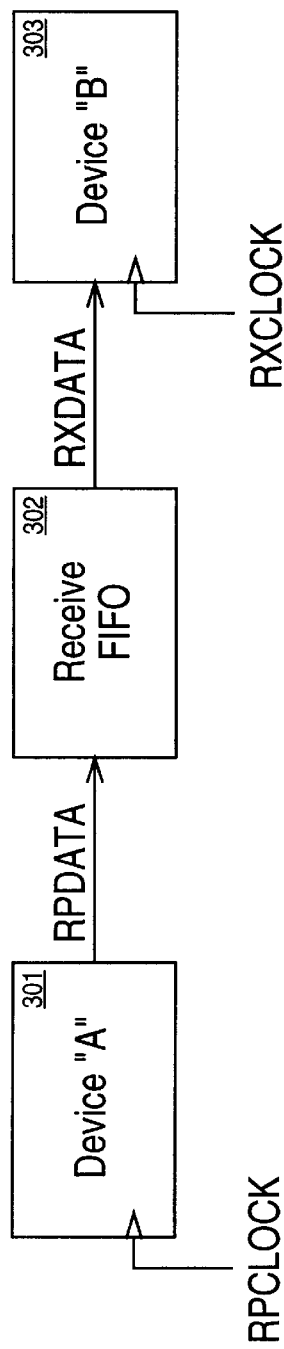
FIG. 3A shows a block diagram of a Receive FIFO that is used to accept incoming data at one clock rate and convert it to a different clock rate which is compatible with that of the receiving device.

FIG. 3A shows a block diagram of a Receive FIFO 302 that is used to accept incoming data at one clock rate and convert it to a different clock rate which is compatible with that of the receiving device 303. A first device or transmission medium 301 generates or carries data at an RPCLOCK speed. The incoming data RPDATA is input to Receive FIFO 301 at the receive clock RPCLOCK rate (e.g., 20 MHz). Receive FIFO 301 converts and outputs the received data RXDATA at a different clock speed RXCLOCK (e.g., 50 MHz). The output data RXDATA is at a clock speed RXCLOCK which is compatible with a second device 303. Thereby, device 303 can now process the incoming data at its inherent clock speed of RXCLOCK.

Figure 3B:
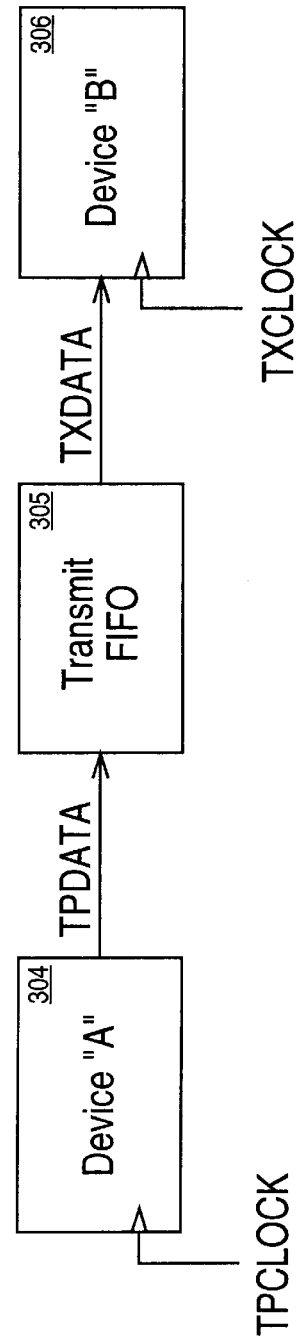
FIG. 3B shows a block diagram of a Transmit FIFO that is used to transmit outbound data from a transmitting device at one clock rate and convert it to a different clock rate which is compatible with that of the receiving device or transmission medium.

FIG. 3B shows a block diagram of a Transmit FIFO 305 that is used to transmit outbound data from a transmitting device 3036 at one clock rate and convert it to a different clock rate which is compatible with that of the receiving device or transmission medium 304. Device 306 generates data at an TXCLOCK speed (e.g., 50 MHz). The data to be transmitted TXDATA is input to Transmit FIFO 305 at the transmit clock TXCLOCK rate (e.g., 50 MHz). Transmit FIFO 305 converts and outputs the transmit data TXDATA to a different clock speed TPCLOCK (e.g., 20 MHz). The data TPDATA output from Transmit FIFO 305 is now at a clock speed TPCLOCK, which is compatible with device or transmission medium 304. Thereby, device or transmission medium 304 can now process or convey the outbound data TPDATA at its inherent clock speed of TPCLOCK (e.g., 20 MHz).

Figure 4:
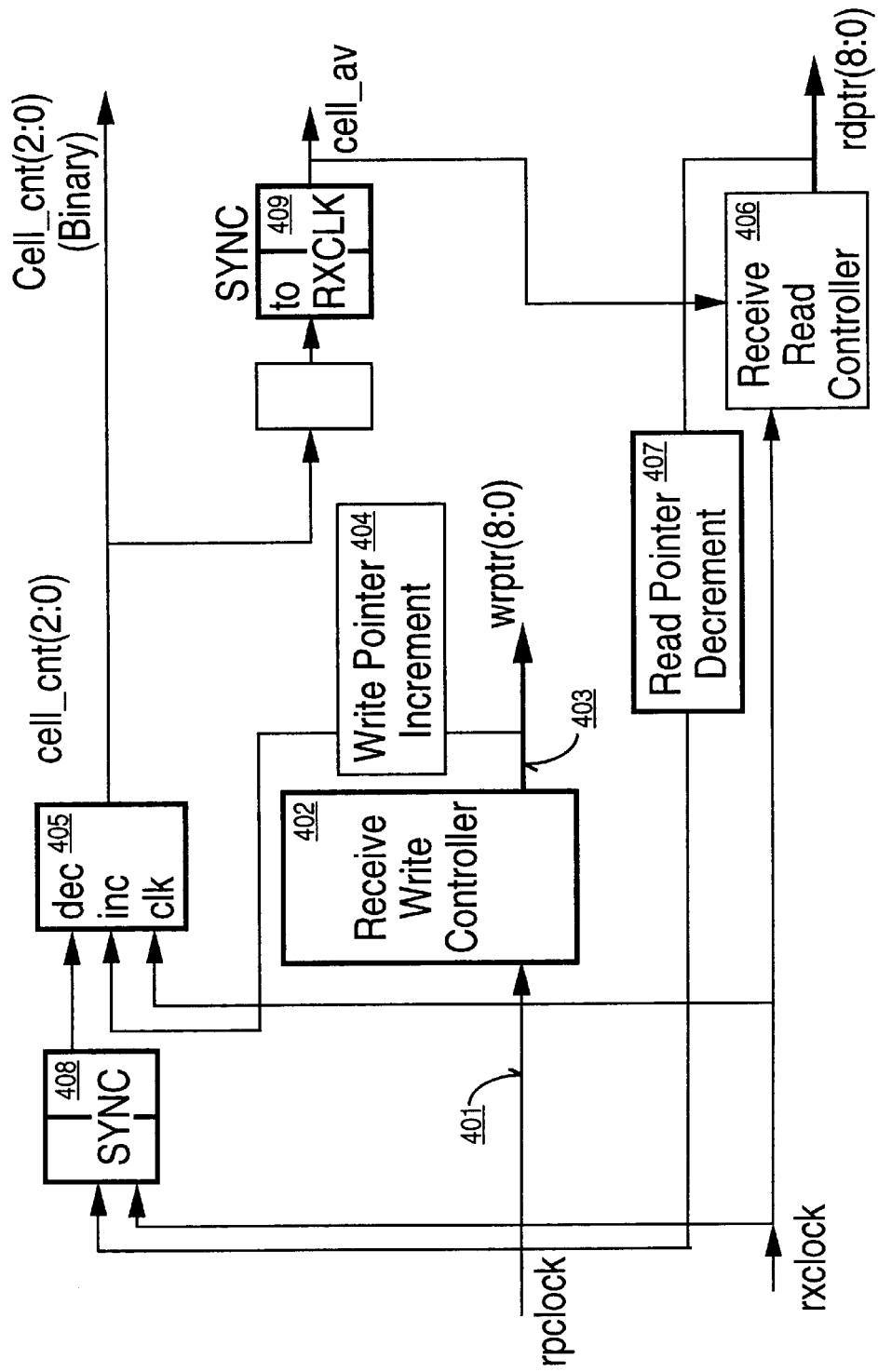
FIG. 4 shows a block diagram of the currently preferred embodiment of a FIFO controller used for receiving data.

As discussed above, two FIFO's are used—one to handle the reception of data and another to handle the transmission of data. Hence, two FIFO controllers are used to control these two FIFOs in order to ensure that the transfer of data between the two clock domains associated with a FIFO is performed without any errors. FIG. 4 shows a block diagram of the currently preferred embodiment of a FIFO controller used for receiving data. Referring back to the example given above in FIG. 3A, an RXCLOCK is chosen to be 50 MHz and RPCLOCK is chosen to be 20 MHz. These two clock speeds represent the two different clock domains corresponding to the different data rates associated with different devices and/or transmission lines.

The RPCLOCK line 401 is used to clock the Receive Write Controller block 402. Receive Write Controller block 402 controls the flow of data being written into the Receive FIFO via the 9-bit wrptr(8:0) bus 403. This flow of data written into the Receive FIFO is at a clock rate of RPCLOCK (e.g., 20 MHz). Furthermore, the flow of data from Receive Write Controller 402 is input to Write Pointer Increment 404. The function of Write Pointer Incrementer 404 is to generate an increment signal for each byte or cell of data being written into the Receive FIFO. A cell corresponds to ATM applications and represents 53 bytes of data. The output from Write Pointer Incrementer 404 is used to increment counter 405. Hence, for each byte/cell being written into the Receive FIFO, counter 405 is incremented by one. Counter 405 is clocked by the RXCLOCK. In this manner, the amount of data being written into the Receive FIFO is readily tracked.

The RXCLOCK signal, running for example at 50 MHz, is used to clock the Receive Read Controller block 406. Receive Read Controller block 406 is used to control the flow of data being read out from the Receive FIFO. Consequently, the data is being read out from the Receive FIFO according to the RXCLOCK clock rate (e.g., 50 MHz). A Read Pointer Decrement block 407 generates a decrement signal corresponding to each byte/cell that is read out from the Receive FIFO. The decrement signal is used to decrement counter 405. However, before the decrement signal is sent on to counter 405, it is synchronized by Sync block 408. Basically, Sync block 408 synchronizes the decrement signal from the Read Pointer Decrement block 407 to the RXCLOCK signal. The synchronized In short, counter 405 is incremented each time a cell is written to the Receive FIFO, and counter 405 is incremented each time a cell is read from the Receive FIFO. It should be noted that other embodiments may counter when data is written into the counter. Hence, the value contained in counter 405 indicates the amount of data currently being stored in Receive FIFO. Given this information and the size of the Receive FIFO, one knows its remaining capacity. The cell_av output signal, indicating synchronized to the RXCLOCK clock by Sync block 409. The cell_av signal is used to control the Receive Read Controller 406. It should be noted that both the cell_av signal and the decrement signal are generated in the same clock domain (e.g., RXCLOCK) and then synchronized to another clock domain (e.g., RPCLOCK). This guarantees that the data is transferred between the two clock domains without any errors, irrespective of the phase difference between the two different clock signals. The cell_av signal is used as an indication to the Read Controller 406 that at least one cell is in the FIFO and is ready to be read out.

Figure 5:
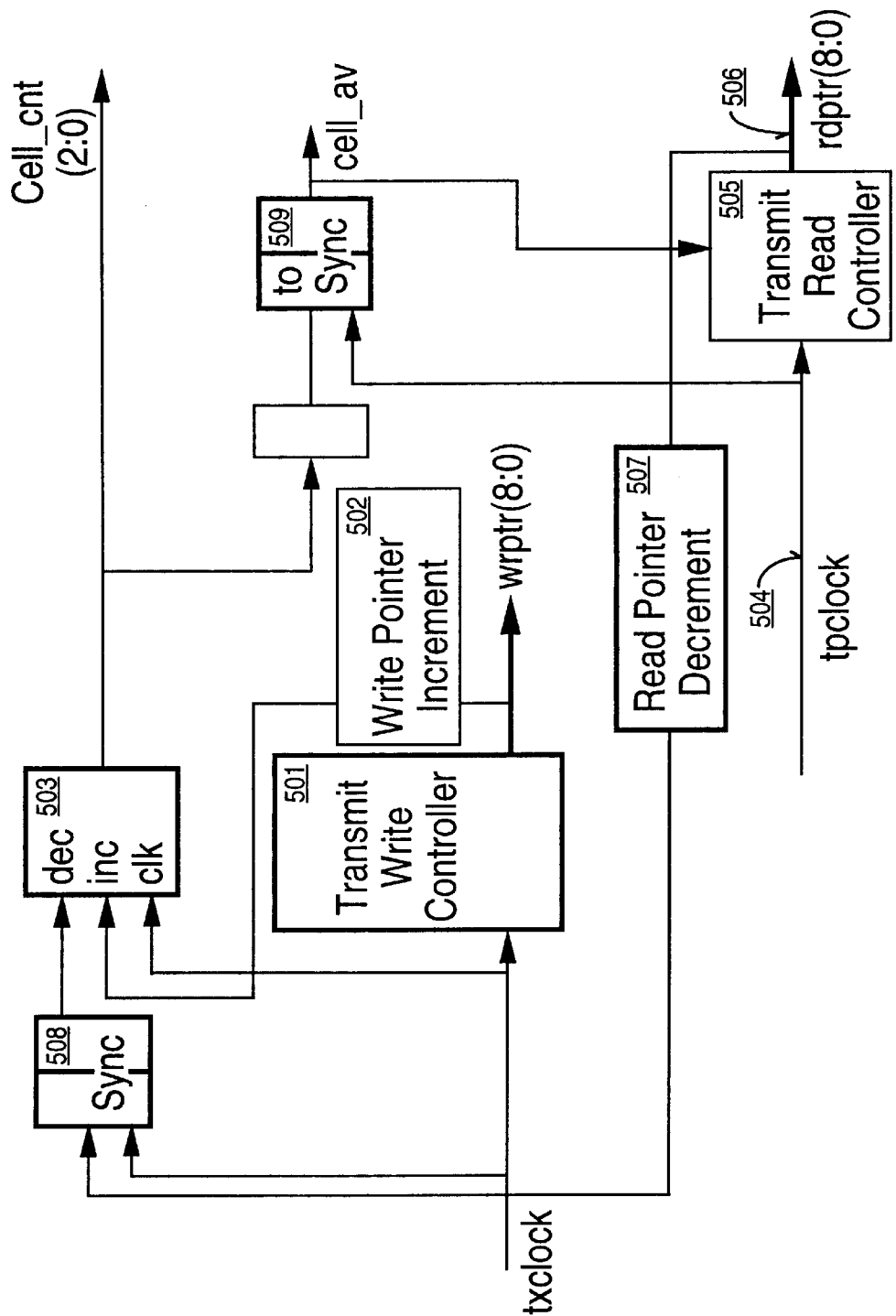
FIG. 5 shows a block diagram of the currently preferred embodiment of a FIFO controller used for transmitting data.

FIG. 5 shows a block diagram of the currently preferred embodiment of a FIFO controller used for transmitting data. Referring back to the example given above in FIG. 3B, a TXCLOCK is chosen to be 50 MHz and a TPCLOCK is chosen to be 20 MHz. These two clock speeds represent the two different clock domains corresponding to the different data rates associated with different devices and/or transmission lines. The TXCLOCK signal is used to clock the Transmit Write Controller block 501. Transmit Write Controller block 501 controls the flow of data being written into the Transmit FIFO. The data is being written into the Transmit FIFO according to the TXCLOCK clock rate (e.g., 50 MHz). A Write Pointer Increment block 502 generates an increment signal corresponding to each byte/cell that is written into the Transmit FIFO.

The increment signal is used to increment counter 503. Hence, for each byte/cell being written into the Transmit FIFO, counter 503 is incremented by one. In this manner, the amount of data being written into the Transmit FIFO is readily tracked.

The TPCLOCK line 504 is used to clock the Transmit Read Controller block 505. Transmit Read Controller block 505 controls the flow of data read out of the Transmit FIFO via the 9-bit rdptr(8:0) bus 506. This flow of data is read from the Transmit FIFO at a clock rate of TPCLOCK (e.g., 20 MHz). Furthermore, the flow of data from Transmit Read Controller 505 is input to Read Pointer Decrement block 507. The function of Read Pointer Decrement block 507 is to generate a decrement signal for each byte or cell of data being read from the Transmit FIFO. The output from Read Pointer Decrement block 507 is used to decrement counter 503. However, before the decrement signal is sent on to counter 503, it is synchronized by Sync block 508. Basically, Sync block 508 synchronizes the decrement signal from the Read Pointer Decrement block 507 to the TXCLOCK signal. The synchronized decrement signal is then used to decrement counter 503. Hence, the value contained in counter 503 indicates the amount of data currently being stored in Receive FIFO. The cell_av output signal is synchronized to the TPCLOCK clock by Sync block 509. It should be noted that both the cell_av signal and the decrement signal are generated in the same clock domain (e.g., TPCLOCK) and then synchronized to another clock domain (e.g., TXCLOCK). Again, this guarantees that the data is transferred between the two clock domains without any errors, irrespective of the phase difference between the two different clock signals.

Figure 6:
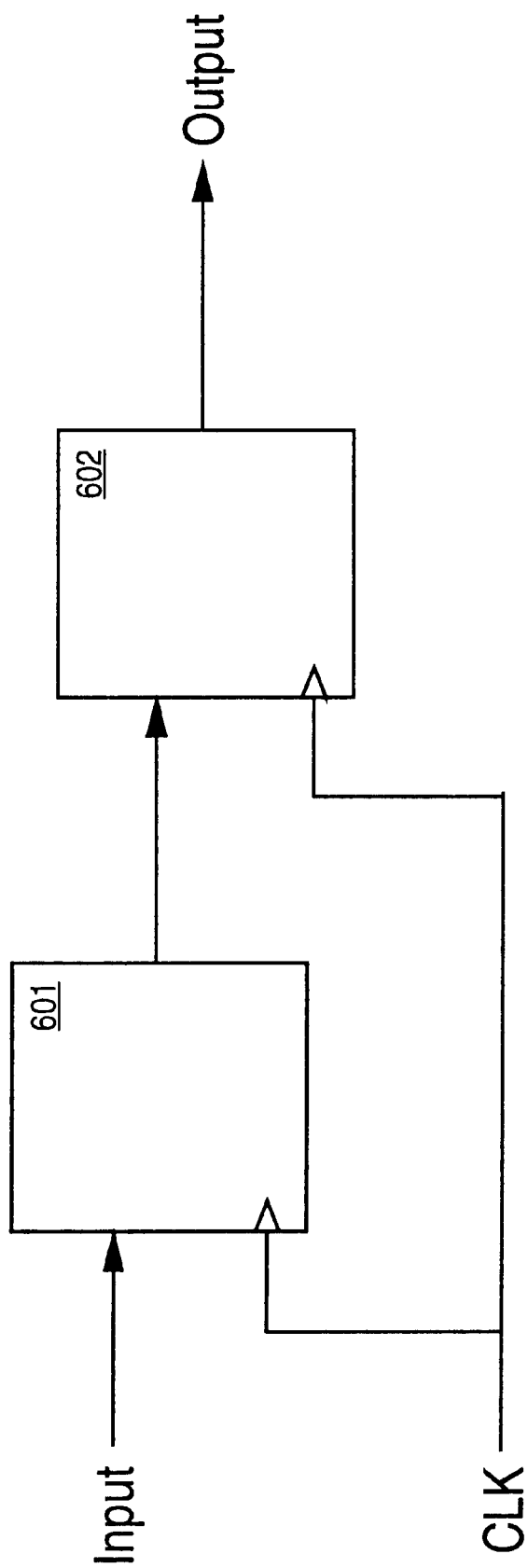
FIG. 6 is a circuit diagram of a synchronization block.

FIG. 6 is a circuit diagram of a synchronization block. Two flip-flops 601 and 602 are cascaded in series. The output from flip-flop 601 is fed as an input to flip-flop 602. Both of the flip-flops are clocked according to a common CLK signal. Thereby, the output signal from flip-flop 602 is synchronized to the CLK signal. As an example, the Sync block 408 of FIG. 4 may be implemented by the two flip-flops shown in FIG. 6. The decrement signal from the Read Pointer Decrement block 407 is input to flip-flop 601, and the RXCLOCK signal is used to clock both flip-flop 601 and 602. This synchronizes the decrement signal to the RXCLOCK speed. The output from flip-flop 602 is then used to decrement counter 405.

The preferred embodiment of the present invention of an asynchronous FIFO controller is thus described. While the present invention has been described in particular embodiments, it should be appreciated that the present invention should not be construed as limited by such embodiments, but rather construed according to the below claims.

What is claimed is:

1. A FIFO controller circuit for controlling a FIFO buffer which receives data, temporarily stores the data, and outputs stored data, comprising:

a write controller coupled to the FIFO buffer which writes received digital data into the FIFO buffer, wherein the write controller writes the digital data into the FIFO buffer at a write speed;

a read controller coupled to the FIFO buffer which reads data from the FIFO buffer, wherein the read controller reads the digital data from the FIFO buffer at a read speed, the read speed being different than the write data;

a counter coupled to the write controller for generating an output signal indicating an amount of available memory of the FIFO buffer by incrementing the counter when the write controller writes data into the FIFO buffer and by decrementing the counter when the read controller reads data out of the FIFO buffer, wherein the counter is clocked at the read speed;

synchronization logic coupled to the read controller and the counter for synchronizing a decrement signal generated according to the read controller and the output signal from the counter to the read speed.

2. The FIFO controller of claim 1, wherein the synchronization logic is comprised of:

a first flip-flop for accepting the decrement signal, wherein the first flip-flop is clocked at the read speed;

a second flip-flop coupled in series with the first flip-flop for accepting as an input signal the output signal from the first flip-flop, wherein the second flip-flop is clocked at the read speed.

3. The FIFO controller of claim 1, wherein the write clock speed is 50 MHz and the read speed is 20 MHz.

4. The FIFO controller of claim 1 further comprising:

a first device coupled to the FIFO, wherein the first device operates at the write speed;

a second device coupled to the FIFO, wherein the second device operates at the read speed.

5. The FIFO controller of claim 1 further comprising:

a first device coupled to the FIFO, wherein the first device operates at the write speed;

a transmission medium coupled to the FIFO, wherein the transmission medium conveys data at the read speed.

6. The FIFO controller of claim 1, wherein the FIFO buffer is comprised of SRAM memory.

7. The FIFO controller of claim 1, wherein the counter counts a number of asynchronous transfer mode cells.

8. An apparatus for controlling memory, wherein data is written into the memory at a first clock speed and data is read out from the memory at a second clock speed different from the first clock speed, comprising:
   a counter coupled to the memory for indicating how much capacity is currently available in the memory, wherein the counter is clocked at the first clock speed;
   an incrementer coupled to the counter for generating an increment signal that increments the counter when data is written into the memory, wherein the incrementer is clocked at the first clock speed;
   a decrementer coupled to the counter for generating a decrement signal that decrements the counter when data is read from the memory, wherein the decrementer is clocked at the second clock speed;
   a first synchronizer for synchronizing the decrement signal to the first clock speed before being input to the counter;
   a second synchronizer for synchronizing an output of the counter to the second clock speed, wherein the output from the counter indicates an amount of available memory.

9. The apparatus of claim 8, wherein the first synchronizer is comprised of:
   a first flip-flop for accepting the decrement signal, wherein the first flip-flop is clocked at the second clock speed;
   a second flip-flop coupled in series with the first flip-flop for accepting as an input signal the output signal from the first flip-flop, wherein the second flip-flop is also clocked at the second clock speed.

10. The apparatus of claim 8, wherein the first clock speed is 50 MHz and the second clock speed is 20 MHz.

11. The apparatus of claim 8 further comprising:
   a first device coupled to the memory, wherein the first device operates at the first clock speed;
   a second device coupled to the memory, wherein the second device operates at the second clock speed.

12. The apparatus of claim 8 further comprising:
   a first device coupled to the memory, wherein the first device operates at the first clock speed;
   a transmission medium coupled to the memory, wherein the transmission medium conveys data at the second clock speed.

13. The apparatus of claim 8, wherein the memory is comprised of a FIFO memory.

14. The apparatus of claim 8, wherein the counter counts a number of asynchronous transfer mode cells.

15. A FIFO controller circuit for controlling a receive FIFO buffer which receives data at a first clock speed and outputs data at a second clock speed different from the first clock speed, comprising:
   a first write controller coupled to the receive FIFO buffer for controlling writing of digital data into the receive FIFO buffer, wherein the first write controller is clocked at the first clock;
   a first read controller coupled to the receive FIFO buffer for controlling the reading of data from the receive FIFO buffer, wherein the first read controller is clocked at the second clock;
   a first counter coupled to the first write controller for generating an output signal indicating an amount of available memory of the receive FIFO buffer by decrementing the first counter when data is written into the receive FIFO and incrementing the first counter when data is read out of the receive FIFO buffer, wherein the first counter is clocked at the second clock;
   a first synchronization logic coupled to the read controller and the counter for synchronizing a decrement signal to the second clock and for synchronizing the output signal from the first counter to the second clock, wherein phase differences between the first clock and the second clock do not produce any data errors.

16. The FIFO controller circuit of claim 15 further comprising:
   a transmit FIFO buffer;
   a second counter coupled to the transmit FIFO buffer for indicating how much capacity is currently available in the transmit FIFO buffer, wherein the second counter is clocked at the first clock;
   a second incrementer coupled to the second counter for generating a second increment signal that increments the second counter when data is written into the transmit FIFO buffer, wherein the second incrementer is clocked at the first clock;
   a second decrementer coupled to the second counter for generating a decrement signal that decrements the second counter when data is read from the transmit FIFO buffer, wherein the second decrementer is clocked at the second clock;
   a first synchronizer for synchronizing the decrement signal to the first clock speed before being input to the counter;
   a second synchronization logic coupled to the transmit FIFO buffer for synchronizing an output of the second counter to the second clock and for synchronizing the second decrement signal to the first clock.

* * * * *